United States Patent [19]

Mendelsohn et al.

[11] 3,845,438

[45] Oct. 29, 1974

[54] TAPE INSULATED CONDUCTOR

[75] Inventors: Morris A. Mendelsohn, Pittsburgh; James D. B. Smith, Turtle Creek, both of Pa.

[73] Assignee: Westinghouse Electric Corporation, Pittsburgh, Pa.

[22] Filed: Apr. 17, 1973

[21] Appl. No.: 351,918

Related U.S. Application Data

[62] Division of Ser. No. 210,878, Dec. 22, 1971, Pat. No. 3,759,734.

[52] U.S. Cl. ....... 336/209, 174/120 C, 174/120 SR, 174/121 SR, 310/208
[51] Int. Cl. ............................................ H01j 27/28
[58] Field of Search ...... 174/120 C, 120 R, 120 SR, 174/121 R, 121 SR; 330/209

[56] References Cited
UNITED STATES PATENTS

| | | | |
|---|---|---|---|
| 2,260,024 | 10/1941 | Hall | 174/121 SR |
| 2,479,417 | 8/1949 | Schulman | 336/209 |
| 3,436,815 | 4/1969 | Sheets | 174/120 R |

*Primary Examiner*—E. A. Goldberg
*Attorney, Agent, or Firm*—R. D. Fuerle

[57] ABSTRACT

A binding tape is made by coating a ribbon having glass fibers in the fill direction and a flexible, thermally stable fiber in tee warp direction, with a swellable resin composition and removing the excess composition. The tape is lap-wound over an electrical conductor which is then immersed in solventless resin under pressure. The conductor is removed from the solventless resin and the tape prevents the solventless resin from seeping out before it is cured.

24 Claims, 1 Drawing Figure

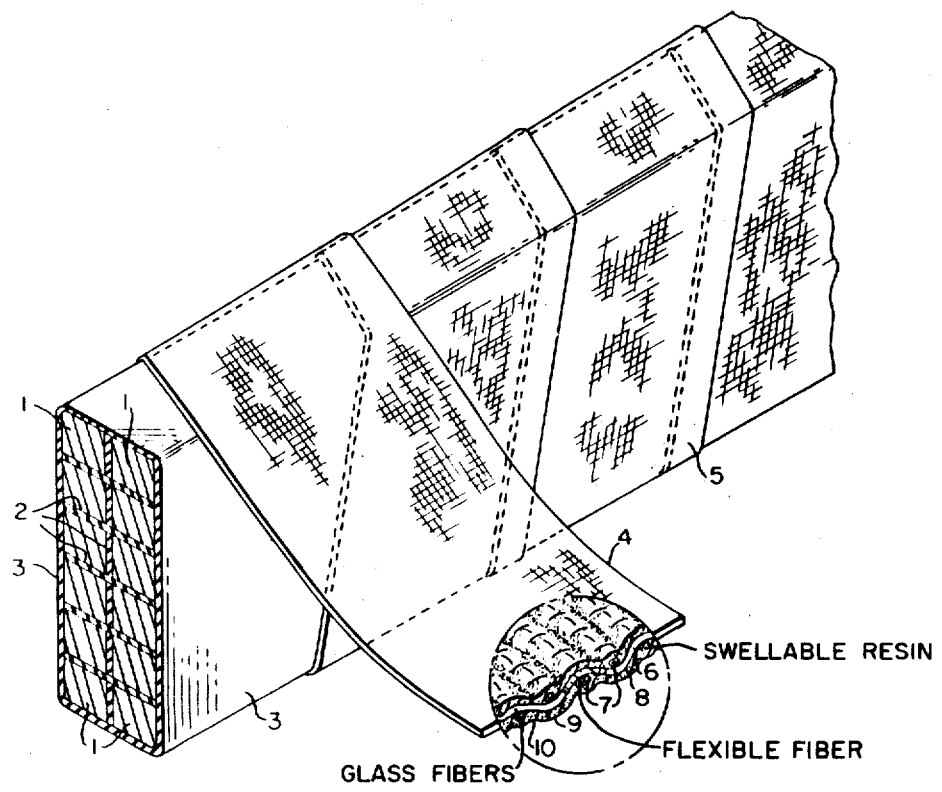

TAPE INSULATED CONDUCTOR

This application is a division of application Ser. No. 210,878, filed Dec. 22, 1971, titled "Binding Tape and Its Preparation" now U.S. Pat. No. 3,759,734.

BACKGROUND OF THE INVENTION

In the manufacture of electrical coils for motors, insulation is placed over a coil and is held in place with a binding tape. The coil is immersed in a solventless resin which is under pressure. The coil is then removed from the solventless resin and the resin is cured. The purpose of the resin is to hold the insulation in place and to fill the voids. Voids permit moisture to enter the coil which can short-circuit the coil and burn it out.

A persistent problem in this process has been that the resin drains out of the insulation and through the tape before the resin can be cured. Considerable efforts have been made to find a tape which would permit the resin to flow into the insulation but would not permit the resin to drain out. A Mylar (polyethylene terephthalate) tape has been used but that tape, even when butt-lapped, did not permit the resin to flow into the insulation well which resulted in voids and poor bonding of the insulation to the copper coil. Also, that tape was expensive and had to be removed after the resin was cured because it was not thermally stable, which was an additional operation and which left the coil looking untidy.

Butt-lapped woven glass tape has also been used but it retained the resin poorly and the coil had to be impregnated several times.

SUMMARY OF THE INVENTION

We have found that a conductor lap-wrapped with a tape having a rough-textured surface coated with a swellable resin composition, will permit a solventless resin to flow past it to the conductor but will substantially deter the solventless resin from draining out. While we do not wish to be bound by theories we believe that the rough-textured surface permits the solventless resin to flow past the laps, but that there is an interaction between the tape and the solventless resin which causes the tape to swell at the lapped edges, creating a seal which keeps the solventless resin in.

The use of our tape not only results in a very substantial increase in the amount of resin retained, but the resin retained is more uniformly distributed with far fewer and smaller voids, especially at the ends of motor coils or "knuckles" where resin loss was particularly bothersome.

Also, when our tape is used to wrap a coil breakdown voltage increases of about 5,000 volts have been obtained over a glass tape wound coil which means less mica insulation can be used. We have also observed a decrease in power factor values of 20 percent or more when our tape is used to wrap motor coils over coils wound with glass tape. This decrease means that the insulation is better and that less energy is being lost through heat.

THE DRAWING

The accompanying drawing is an isometric view of a section of a motor coil wrapped with a tape according to this invention. In the drawing 12 copper wires 1 are separated by insulation 2 and wrapped with an insulation tape such as mica tape 3. A tape 4 according to this invention is wound over the mica insulation forming laps 5.

Referring to the enlargement window, tape 4 consists of glass fibers 6 in the fill direction and a flexible fiber 7 in the warp direction. A swellable resin 8 coats the fibers to form hills 9 and valleys 10 in the tape.

THE RIBBON

The tape is made from a woven ribbon which has glass fibers in fill direction (crosswise) and a flexible fiber in the warp direction (lengthwise). Preferably, the glass fibers are bundled as threads which are about 0.5 to 15 mils in diameter and the flexible threads are about 0.5 to about 15 mils in diameter.

The flexible fiber should be sufficiently flexible to be wound over a ½ inch diameter mandrel without breaking, cracking or splitting. It should have an elongation greater than about 2 percent so that it can expand during swelling without breaking. Also, it should be thermally stable at about 105°C in order to be useful in motor coils. Dacron fibers (i.e., polyethylene terephthalate) are preferred as they offer the best combination of these properties and low cost, but polyamideimide fibers, nylon fibers, polyacrylonitrile fibers, etc. may also be used.

The glass and flexible fibers and the type of weave should be chosen so that the resulting ribbon is about 2-½ to about 15 mils thick, and preferably about 3 to about 9 mils thick, since if the tape made from the ribbon is too thick coils wound with it will not fit into their slots, and if the tape is too thin it will be difficult to make and work with.

A very wide ribbon (e.g. 36 inches) may be used to make the tape which is then cut longitudinally into smaller strips, or small strips of ribbon may be used in making the tape. The small strips and the resulting tape are typically about ¼ to about 2 inches wide, and preferably about ¾ to about 1-½ inches wide as these sizes fit most commercial machinery and very wide tape will not have enough overlaps to give good impregnation and very narrow tape is not economical.

THE SWELLABLE RESIN COMPOSITION

The ribbon is coated with a swellable resin composition, that is, a composition which will swell about 5 to about 40 percent within a few minutes when contacted by the solventless impregnating resin. The resin composition should preferably be wettable by the solventless impregnating resin. The swellable resin composition should swell quickly enough to keep the solventless resin from draining out but not so quickly that the solventless resin cannot impregnate the insulation. However, faster-swelling compositions may be used if more pressure is used to impregnate the solventless resin. A swellable resin composition may be prepared from 1 part (all parts herein are by weight) curable resin, about 0.03 to about 1.1 parts filler, and about 0.014 to about 0.26 parts swell accelerator. A preferred swellable resin composition may be prepared from 1 part curable resin, about 0.2 to about 0.5 parts filler, and about 0.03 to about 0.20 parts swell accelerator.

The preferred curable resin is a polyester resin as it makes a good insulator and is tough and flexible. The preferred polyester resin is made by first preparing an alkyd polyester from (1) about 15 to 30 percent (all percentages herein are by weight) of a saturated trihydric aliphatic organic compound having 3 to 7 carbon atoms such as propanetriol, butanetriol, trimethylolethane, and preferably glycerol, (2) about 15 to 25 percent of at least one low molecular weight aromatic compound containing hydroxyl and carboxyl groups such as salicylic acid, (3) about 25 to 40 percent of a drying oil such as dehydrated castor oil, and (4) about 25 percent to 40 percent aromatic dicarboxylic acid having 8 to 12 carbon atoms such as isophthalic acid, phthalic acid, and terephthalic acid (see U.S. Pat. No. 3,378,630). On a solid basis, one part of the alkyd polyester is then blended with up to about 0.08 parts anti-oxidants, up to about 0.6 parts epoxy resins having an EEW (epoxy equivalent weight) of 65 to 6,000, and up to about 0.35 part thermosetting formaldehyde resin. Preferably one part of the alkyd polyester is blended with about 0.01 to 0.05 part anti-oxidant, about 0.02 to about 0.45 part epoxy resin having an EEW of 170 to 700, and about 0.1 to about 0.25 part thermosetting formaldehyde resin. Anti-oxidants retard the oxidation of the organic compounds by molecular oxygen. Examples of anti-oxidants include hydroquinone, hydroquinone monobenzyl ether, octyl diphenylamine, polyalkyl polyphenols, phenyl- $\beta$ - naphtylamine, diphenyl- $p$-phenylenediamine, $o$-cresol, and 4-$t$ butylcatechol. The preferred anti-oxidant which works the best is polymerized trimethyldihydroquinoline. The epoxy resin is preferably a diglycidyl ether of bisphenol A because it works well, but cycloaliphatic polyepoxides, polyethers-base polyepoxides, aliphatic epoxies, and other diglycidyl derivatives of organic compounds could also be used. The formaldehyde resin is preferably a melamine formaldehyde resin as it works well, but phenol-formaldehyde, urea-formaldehyde, etc. resins could also be used.

Examples of other suitable curable resins include phenolic novolak epoxies, cresylic novolak epoxies, acrylics, phenolics, oil-modified phenolics, and polyamideimides. Mixtures of curable resins may also be used.

The preferred filler is talc, silica, powdered mica, calcium carbonate, calcium silicate, or mixtures thereof as they are non-conducting and inexpensive. Other suitable fillers include metal oxides such as iron oxide or aluminum oxide, magnesium carbonate, magnesium silicate, barium sulfate, powdered glass, calcium sulfate, lithium aluminum silicate and clay.

The swell accelerator is a low (preferably less than 2,000) molecular weight material with hydroxyl, carboxyl, oxirane, and/or amino functional groups, and preferably only hydroxyl and/or carboxyl groups as they are quite stable at low temperatures and therefore the resin composition has a longer shelf life. The swell accelerator should not react substantially with the swellable resin composition before the solventless resin is cured (i.e., it should be at least 55 percent unreacted after 1 hour at 100°C); it should therefore not contain anhydride or isocyanate groups. The swell accelerator is believed to interact with the solventless resin to cause swelling. Preferably, it also reacts with the swellable resin composition during the curing of the solventless resin and becomes part of the polymeric structure so that it cannot be leeched out later. Castor oil is the preferred swell accelerator as it has the best combination of these properties, but vinyl plasticizers (such as dibutyl phthalate and dioctyl phthalate), monobutyl adipate, hexamethylenediamine, polyols such as glycerol, polyoxypropylene polyols, polyoxyethylene polyols, alkyl acids such as stearic acid, brassylic acid, etc. may also be used.

Optional ingredients include curing agents, pigments, dyes, non-curable resins, anti-oxidants, and catalysts. In addition, the swellable resin composition is applied to the ribbon from a solvent or suspending agent as otherwise it is too viscous. The ratio of solids to solvent in the solution is about 20 to 80 to about 70 to 30. The preferred solvents are toluene, xylene, methylethyl ketone and methyl isobutyl ketone, ethylene chloride, and mixtures thereof. Other suitable solvents include butyl acetate, ethyl acetate, cellosolve dioxane, etc.

MAKING THE TAPE

The ribbon is immersed into a bath of the swellable resin composition and the excess composition is removed to expose the rough-textured surface of the ribbon. The amount of composition remaining on the ribbon is critical since, if too much composition remains, the tape will be too smooth to permit the solventless resin to pass through the laps. If too little composition remains on the ribbon it will develop pinholes and will not seal well. The amount of composition remaining on the ribbon should be about 75 to about 380 percent of the ribbon weight, and for best results, about 110 to about 310 percent of the ribbon weight. The amount of composition remaining on the ribbon may also be described as about 0.01 to about 0.15 gms of composition per square inch of tape and preferably about 0.051 to about 0.065 gms of composition per square inch of tape, that is, the weight ratio of composition to ribbon is preferably about 1.10 to 1.0 to about 3.10 to 1.0.

The excess resin composition may be removed in any suitable way, for example, draining, passing the tape between two opposite scrapers about 8 mils apart or between brushes. The composition could also be applied to the ribbon as it passes between rollers which squeeze off the excess. Preferably, the excess composition is removed by passing the tape over two separate scrapers which scrape one side then the other side, as with this method it is easy to control the amount of composition remaining by the pressure of the tape against the scrapers and they do not damage the tape.

The resin composition must be cured to such an extent that it is dry and is not tacky, is not pressure-sensitive, and is beyond the B-stage, otherwise it will seal before an adequate amount of solventless resin can pass by the laps. The cure is typically at between about 150 and about 220°C for about 15 minutes to about 2-½ hours; above about 220°C less time is required but the composition may degrade. Best results are obtained at about 190° to about 200°C which usually takes about 2 hours. After curing the tape will be about 3 to about 20 mils thick depending on the thickness of the ribbon used, the tape of weave, and the diameter of the fibers in the ribbon. For best results, however, the final tape should be about 4 to 12 mils thick. It should be "rough" in that it has hills and valleys, where the hills are about 1 to about 6 mils higher than the valleys, and it should have an elongation greater than about 2 percent.

MAKING AN ELECTRICAL ARTICLE

A conductor, typically a coil for the armature or stator of a motor, is used in making the electrical article. If the conductor is to carry low voltage (less than 1 Kv) the tape itself can be the only insulation. For higher voltages, the conductor is covered with an insulator, preferably mica, as mica has the best dielectric properties, although Kraft paper, asbestos, Nomex paper (a DuPont nylon product) etc. could also be used. Mica tape is preferred which is about the same width as the tape of this invention and about 3-½ to about 10 mils thick.

The binding tape is wound over the conductor by hand or by machine, preferably at a pressure of about 1/10 to about 10 pounds per inch of tape width. The tape should be lapped about ⅛ to about ½ inch to obtain the benefits of this invention.

The taped conductor is then immersed in a bath of a solventless (i.e., 100 percent solids) electrical impregnating resin. Each coil may be immersed separately or together in an assembled rotor or stator. Impregnating resins are curable resins having a viscosity of less than about 1,200 centipoises at room temperature and are well known in the art. Examples include styrene-polyester, epoxy, epoxy-anhydride, styrene-epoxy-anhydride, silicone, and polyurethane resins.

At least about 10 psi and preferably about 40 to about 100 psi of pressure are applied to the solventless resin to force it between the laps of the tape and into the spaces in the insulation. The conductor is then removed from the bath, the excess solventless resin is permitted to drain off, and the solventless resin is cured. The cure temperature will depend upon the resin used. For example, polyesters are cured at about 80°C and epoxies at about 150°C. The cure may require from 30 minutes to 16 hours depending on the resin used. During this cure the swell accelerator has undergone essentially as much reaction as it ever will.

The following examples further illustrate this invention:

EXAMPLE 1

A polyester resin is prepared as follows:

A mixture, by weight, of 34.2 parts of dehydrated castor oil, 10.7 parts of glycerol, and 0.035 part of calcium hydroxide, was charged into a reaction vessel and heated at 240°C for 1.5 hours while being agitated and sparging with nitrogen. Then, 12.3 parts glycerol, 21.4 parts salicylic acid, 32.2 parts isophthalic acid, 0.5 part isopropyl titanate, and about 20 parts of xylene were added to the reaction mass and the mixture was processed azeotropically, using continuous decanting to separate water of reaction and to return refluxing xylene to the vessel, for approximately 4.5 hours at a temperature in the range of 200° to 235°C with nitrogen sparging and rapid agitation. The reaction is concluded when the control vicosity of a 50 weight percent solution of the polyester in xylene measures S-T, Gardner-Holdt. At this point toluene is added to the resulting alkyd to give a solution containing 67 weight percent of non-volatiles.

EXAMPLE 2

The following swellable composition was prepared:

| Parts by Weight | |
|---|---|
| 1100 | polyester of Example 1 |
| 400 | talc |
| 25 | silicon dioxide sold under the trademark "Cab-O-Sil" by Cabot Corp. |
| 60 | 50% solution in xylene of polymerized trimethyl dihydroquinoline (sp. gr. = 1.08, m.p. = 100–120°C) sold under the trademark "Agerite D" by Vanderbilt Chemical Co. |
| 75 | castor oil |
| 275 | toluene |
| 87.5 | diglycidyl ether prepared from epichlorohydrin and bisphenol A (E.E.W. = 175–200) sold under the trademark "Epon 828" by Shell Chemical Co. |
| 282.5 | 66⅔% solution in methylethyl ketone of a diglycidyl ether prepared from epichlorohydrin and bisphenol A (E.E.W. = 450–550) sold under the trademark "Epon 1001" By Shell Chemical Co. |
| 200.0 | 65% solution in xylene of butylated melamine-formaldehyde resin (viscosity = Z – Z4, mineral spirits tolerance = 0.4–2.0) sold under the trademark "Resimene 882" by Monsanto Co. |

EXAMPLE 3

A woven ribbon 3.5 mils thick and ½ inch wide having glass fibers in the fill direction and Dacron fibers in the warp direction was immersed in the composition of Example 2. After the excess resin had drained off, the composition was cured at 200°c for 2 hours to produce a tape having rough-textured surfaces.

Two copper tubes 6 inch long and ½ inch in diameter were wrapped 4 inches of their lengths with ½ inch Dacron-backed mica tape. The first tube was then one-fourth lapped with the tape just described and the second tube was butt-lapped with ½ inch Mylar tape. Both tubes were immersed in a 65 percent styrene-35 percent polyester resin at 95–100 psi. The tubes were removed, drained of excess resin, and cured at 110°C for 8 hours. The insulation was then stripped from the tube, weighed, and compared to the initial insulation weight. The tube wound with our binding tape had a very strong bond of the mica to the copper and the weight increase was 67.2 percent. The tube wound with the Mylar tape has a very weak bond of the mica to the copper and the weight increase was only 26.0 percent.

EXAMPLE 4

Three copper tubes wound with our binding tape as described in Example 3 were immersed in the following three resins at 95 psi.

Resin 1
- 70 parts diglycidyl ether prepared from bisphenol A and epichlorohydrin (E.E.W. = 175–195, viscosity = 7,000–10,000 cps at 25°C) sold by Ciba Co. under the trademark "Araldite 6005."
- 30 parts diglycidyl ether of 1,4-butanediol sold by Ciba Co. under the trademark "RD2."
- 2 parts a 1 to 1 mole mixture of $BF_3$ and monoethylamine
- 6.5 parts furfuryl alcohol.

Resin 2
- 62.5 parts diglycidyl ether prepared from bisphenol A and epichlorohydrin (E.E.W. -180–200, viscosity 10,000–16,000 cps at 25°C) sold by Celanese Corp. under the trademark "Epi-Rez 510."
- 37.5 parts diglycidyl ether prepared from bisphenol A and epichlorohydrin (E.E.W. = 475–575, Durran's softening pt. 70°–80°C) sold by Dow Chemical Co. under the trademark "DER 661."

3.75 parts maleic anhydride.
80.0 parts styrene.
54.9 parts NADIC methyl anhydride.
0.06 parts p-quinone.
0.48 part 2,5-dimethyl, 2,5-(bis benzoyl peroxide) hexane sold by Lucidol Co. under the trademark "Luperox 118."

Resin 3

70 parts diglycidyl ether prepared from bisphenol A and epichlorohydrin (E.E.W. = 172–176, viscosity 4,000–5,500 cps at 25°C) sold by Dow Chemical Co. under the trademark "DER 332."

30 parts diglycidylether of neopentyl glycol.

100 parts 1-methyltetrahydrophthalic anhydride (E.E.W. = 150–155, viscosity 3–5 cps at 25°C made by CIBA) sold by Union Carbide Co. under the trademark "ZZLA-0334."

0.08 part methyltrioctylphosphonium-dimethylphosphate.

The copper tubes were then removed from resins, drained, and cured at 135°C for 16 hours. The insulation was stripped, weighed, and the weight compared to the initial weight.

Insulation impregnated with Resins 1, 2, and 3 had weight increases of 85.8 percent, 59.3 percent, and 66.2 percent respectively. In all cases the bond of the mica to the copper was very strong.

EXAMPLE 5

A ribbon as described in Example 3 but ¾ inch wide was immersed in the resin composition of Example 2 and drawn between a pair of rounded metal bars 7 to 10 mils apart which removed excess resin. The tape was then cured at 190° to 200°C for 30 to 60 minutes to produce a tape having rough-textured surfaces. This tape was more flexible than the tape of Example 3 and is therefore preferable to it.

Using copper tubes wrapped in mica as described in Example 3, the above tape and tape prepared as in Example 3, both ¾ inch wide and 6.5 mils thick, were ¼ inch lap wound over the tubes. For comparison, a ½ inch wide Mylar tape was butt-lapped over an identical tube.

All tubes were immersed in Resin A which was Resin 1 of Example 4, or Resin B which was made from 65 percent styrene and 35 percent of a polyester of 4 parts adipic acid, 1 part maleic anhydride, and 5.5parts 2,2-bis[p-(3-hydroxypropoxy)phenyl]propane.

The tubes were allowed to drain, and the resins were cured at 135°C. The insulation was removed, weighed and compared to the initial weight. The following table gives the results:

| Impregnating Resin | Tape | Impregnating Pressure (psi) | % Wt. Increase | Strength of Mica-to-Copper Bond |
|---|---|---|---|---|
| B | This Example | 50 | 45.4 | strong |
| B | This Example | 50 | 49.5 | strong |
| B | Example 1 | 45 | 47.7 | strong |
| A | This Example | 50 | 57.5 | strong |
| A | Example 1 | 95 | 85.8 | very strong |
| B | Mylar tape | 95 | 26.0 | weak |

EXAMPLE 6

An armature coil similar internally to the drawing, for carrying 2.3 KV was wrapped with 5-½ turns of Dacron-backed ¾ inch wide mica paper on the straight portions of the coil and 2 layers of ½ inch lapped ¾ inch Dacron-backed mica tape on the ends. Over the mica was hard wrapped a one-fourth lapped layer of ¾ inch tape prepared as described in Example 3.

Another identical armature coil was hand wrapped, but-lapped with a layer of ¾ inch 4 mil thick woven glass tape. Both coils were immersed in a bath of an anhydride-cured epoxy resin at 175°C under 95 psi of pressure for 30 minutes. The coils were removed, hung to drain for 30 minutes, then cured at 150°C for 16 hours.

Using the procedure of ASTM D-150 aluminum foil was wrapped over the straight portions of the A and B side of each coil. The coils were heated to 150°C. Then 0.5, 1, and 2 KV was sent through the coil, and the power factor (a measurement of the current leakage to the aluminum equal to 100 tan where is the loss angle, the angle between the current and voltage cycles) was measured. The following table gives the results:

| Coil Part | KV | Power Factor at 150°C, 60 Hertz | |
|---|---|---|---|
| | | Glass Tape | Our Tape |
| A | 0.5 | 18.6 | 18.8 |
| | 1 | 20.0 | 19.3 |
| | 2 | 37.9 | 21.2 |
| B | 0.5 | 22.8 | 18.5 |
| | 1 | 25.6 | 19.4 |
| | 2 | 44.1 | 22.2 |

The above table shows that the current leakage through the coil was substantially less when our tape was used. Breakdown voltages for the coils were also determined and it was found that the breakdown voltage when our tape was used 5 to 6 KV higher than when the glass tape was used.

The coils were disassembled and examined. The coil with our tape on it had a much more uniformly distributed resin than did the coil with the glass tape, and there were far fewer dry area, especially at the knuckles of the coil. The insulation was weighed and compared to its initial weight and it was found that the coil with our tape on it had a 66.5 percent increase in weight while the coil with the glass tape only increased in weight 59.5 percent.

We claim:

1. An electrical article comprising
   1. a conductor;
   2. a rough-textured tape wrapped around said conductor and overlapped about ⅛ to about ½ inch, said rough-textured tape comprising a woven ribbon having glass fibers in the fill direction and flexible, thermally-stable fibers having an elongation of at least 2 percent in the warp direction, said ribbon being coated with a dry swellable resin composition cured beyond the B-stage; and
   3. a cured solventless resin under said tape.

2. An electrical article according to claim 1 wherein said conductor is a motor coil and electrical insulation separates the coil from the tape.

3. An electrical article according to claim 2 wherein said insulation is mica.

4. An electrical article according to claim 1 wherein said swellable resin composition is about 75 to about 380 percent of the weight of said ribbon.

5. An electrical article according to claim 4 wherein said swellable resin composition is about 110 to about 310 percent of weight of said ribbon.

6. An electrical article according to claim 1 wherein there are about 0.01 to about 0.15 grams of swellable resin composition per square inch of tape.

7. An electrical article according to claim 6 wherein there are about 0.051 to about 0.065 grams of resin per square inch of tape.

8. An electrical article according to claim 1 wherein the ratio of swellable resin composition to said ribbon is about 1.10 to 1.0 to about 3.10 to 1.0.

9. An electrical article according to claim 1 wherein said rough-texture of said tape is hills and valleys where the hills are about 1 to about 6 mils higher than the valleys.

10. An electrical article according to claim 1 wherein said ribbon is about 3-½ to about 8 mils thick and about ¼ to about 2 inches wide.

11. An electrical article according to claim 1 wherein said ribbon is about 5 to about 7 mils thick and about ¾ to about 1-½ inches wide.

12. An electrical article according to claim 1 wherein said glass fibers are about 0.5 to about 15 mils in diameter and said flexible, thermally stable fibers are about 0.5 to about 15 mils in diameter.

13. An electrical article according to claim 1 wherein said flexible thermally-stable fibers are polyethylene terephthalate.

14. An electrical article according to claim 1 wherein said swellable resin composition comprises 1 part curable resin, about 0.03 to about 1.1 parts filler, and about 0.014 to about 0.26 parts swell accelerator.

15. An electrical article according to claim 14 wherein said swellable resinous composition comprises 1 part cross-linkable resin, about 0.2 to about 0.5 part filler, and about 0.03 to about 0.20 part swell accelerator.

16. An electrical article according to claim 14 wherein said filler is selected from the group consisting of talc, silica, powdered mica, calcium carbonate, calcium silicate, and mixtures thereof.

17. An electrical article according to claim 14 wherein said swell accelerator has hydroxyl or carboxyl groups and a molecular weight of less than 2,000.

18. An electrical article according to claim 17 wherein said swell accclerator is castor oil.

19. An electrical article according to claim 14 wherein said curable resin is a polyester resin.

20. An electrical article according to claim 19 wherein said polyester comprises
   1. one part by weight alkyd polyester comprising
      a. about 15 to 30 percent of a saturated trihydric aliphatic organic compound having 3 to 7 carbon atoms;
      b. about 15 to 25 percent of at least one low molecular weight aromatic compound containing hydroxyl and carboxyl groups;
      c. about 25 to 40 percent of a drying oil; and
      d. about 25 to 40 percent of an aromatic dicarboxylic acid having 8 to 12 carbon atoms; and
   2. up to about 0.08 parts by weight anti-oxidant;
   3. up to about 0.6 part by weight epoxy resin having an E.E.W. of about 65 to about 6,000; and
   4. up to about 0.35 part by weight thermosetting formaldehyde resin.

21. An electrical article according to claim 20 wherein the amount of said anti-oxidant is about 0.01 to about 0.05 part by weight, the amount of said epoxy resin is about 0.2 to about 0.45 part by weight, and the amount of said formaldehyde resin is about 0.1 to 0.25 part by weight.

22. An electrical article according to claim 20 wherein said anti-oxidant is polymerized trimethyl dihydroquinoline.

23. An electrical article according to claim 20 wherein said epoxy resin is a diglycidyl ether of bisphenol A.

24. An electrical article according to claim 20 wherein said formaldehyde resin is a melamine-formaldehyde resin.

* * * * *